United States Patent [19]

Weppner et al.

[11] Patent Number: 4,704,341

[45] Date of Patent: Nov. 3, 1987

[54] LITHIUM ION CONDUCTOR

[75] Inventors: Werner Weppner, Stuttgart, Fed. Rep. of Germany; Ervin Hartmann, Budapest, Hungary; Albrecht Rabenau, Stuttgart, Fed. Rep. of Germany

[73] Assignee: Max-Planck Gesellschaft zur Foerderung der Wissenschaften e.V., Goettingen, Fed. Rep. of Germany

[21] Appl. No.: 840,805

[22] Filed: Mar. 18, 1986

[30] Foreign Application Priority Data

Mar. 29, 1985 [DE] Fed. Rep. of Germany ....... 3511703

[51] Int. Cl.$^4$ ............................................. H01M 6/16
[52] U.S. Cl. .................................... 429/192; 252/62.2
[58] Field of Search ....................... 429/192, 194, 191; 252/62.2

[56] References Cited

U.S. PATENT DOCUMENTS 2,597,451  5/1952  Coleman et al. ............... 429/194
3,423,242  1/1969  Meyers et al. ................. 429/194
3,764,385 10/1973  Langer et al. ................. 429/194

FOREIGN PATENT DOCUMENTS 0902929  8/1962  United Kingdom .............. 429/194

*Primary Examiner*—Donald L. Walton
*Attorney, Agent, or Firm*—Felfe & Lynch

[57] ABSTRACT

The present invention provides a lithium ion conductor, consisting of an addition compound of a lithium halide with an alcohol, an amine or a basic organic heterocyclic nitrogen compound.

The present invention also provides a process for the production of this lithium ion conductor, as well as a galvanic element containing it.

17 Claims, No Drawings

LITHIUM ION CONDUCTOR

The present invention is concerned with a new lithium ion conductor, with a process for the production thereof and with a galvanic element containing it.

Because of its strong electropositive character and of its small equivalent weight, lithium in the form of its compounds is of especial interest for solid and liquid, ion-conducting electrolytes. Since lithium has a very small atomic weight and enters into compounds with high energy of reaction, very high energy densities are to be achieved with lithium systems.

However, since lithium reacts with water, aqueous electrolytes cannot be used for lithium systems. Therefore, hitherto batteries have been preponderantly used in which lithium salts dissolved in organic solvents were employed as ion conductors. However, a disadvantage of these electrolytes is that they cannot be used together with lithium as anode since lithium is not stable in these ion conductors. A reaction thereby takes place which increases the inner resistance and limits the storage stability. Furthermore, such systems cannot be recharged.

Another possibility is to use solid electrolytes. However, the previously known solid lithium electrolytes either have a very low conductivity or are thermodynamically unstable. In order to make possible high battery currents, the electrolyte must, therefore, be produced in a very thin layer, which gives rise to process-technical difficulties.

It is an object of the present invention to provide a lithium ion conductor which has a high conductivity, can be used with lithium anodes, is thermodynamically stable and is easy to produce.

Thus, according to the present invention, there is provided a lithium ion conductor, consisting of an addition compound of a lithium halide with an alcohol, an amine or a basic, organic heterocyclic nitrogen compound.

The lithium ion conductor according to the present invention consists of an addition compound in which the organic complex does not play the part of a cation or of an anion binding with the alkali metal ion but rather is present as solvate. It can be present in solid or molten form. The conductivity of the lithium ion conductor according to the present invention is extraordinarily high and is higher than in the case of other known solid alkali metal ion conductors. The production of the new lithium ion conductor is also very simple.

The lithium compound used is a lithium halide, lithium iodide and lithium bromide being preferred and lithium iodide being especially preferred.

The organic complex of the lithium halide according to the present invention is formed with alcohols, amines or basic organic heterocyclic nitrogen compounds. The alcohols used can thereby be primary, secondary or tertiary mono- or polyhydroxy alcohols. There can be used not only aliphatic but also aromatic unsubstituted or substituted alcohols. Aliphatic alcohols containing up to 6 carbon atoms and one or more hydroxyl groups are preferably used, methanol, ethanol and propanol being especially preferred.

Furthermore, as organic component for the formation of the addition compound, there can be used an amine. For this purpose, there can be used all organic amines, such as primary, secondary and tertiary aliphatic amines or aromatic amines, which can be unsubstituted or substituted. Alkylamines with alkyl radicals containing up to 6 carbon atoms and unsubstituted and substituted aniline are especially preferred.

In addition, for the formation of the addition compound of the lithium halide, there can be used a basic organic heterocyclic nitrogen compound. There can be used not only heteroparaffins but also heteroaromatics and heteroolefins. Heteroaromatics with 5 or 6 ring members are especially preferred and pyridine is particularly preferred.

The organic complex of the lithium halide is preferably coordinated three or four times. Lithium iodide coordinated with 3 or 4 molecules of methanol is especially preferred as lithium ion conductor.

The production of the lithium ion conductor according to the present invention is very simple. For this purpose, the lithium halide and the organic compound are mixed together in stiochiometric amounts and reacted. The lithium halide and the organic compound are especially preferably used in an anhydrous state.

The lithium ion conductor according to the present invention can be used for many purposes. Thus, it can be used in a galvanic element which has a lithium anode and a conventional countercathode, such as manganese dioxide, lead iodide or titanium disulphide. Surprisingly, the metallic lithium used as anode does not react with the lithium ion conductor complex, whereas the pure alcohols, amines or heterocyclic compounds react with lithium. Therefore, the galvanic element is very stable. It is an especial advantage of the galvanic element according to the present invention that lithium can be used as electrode, together with the lithium ion conductor, since the voltage in the galvanic element according to the present invention is not only maintained but, after unloading, even a recharging is possible. Therefore, the galvanic element according to the present invention can be used as secondary element. In particular, the galvanic element according to the present invention can be used for miniaturised lithium batteries. Because of their long life and stability, these batteries are especially suitable for clocks, heart pacemakers, microprocessors and the like.

However, in addition, it is also possible to use the lithium ion conductor according to the present invention for memory elements, electrochromic indicators, sensors, timers and display systems.

An especial advantage of the galvanic element according to the present invention is that, after many charging and discharging cycles, it can again be restored to its original state. The relatively low melting points of the addition compounds used according to the present invention permit, by melting the electrolytes, again to produce a good contact between the individual phases if, in the course of time, due to the extreme mass displacements during the discharging or charging, contact problems arise between the solid bodies.

The galvanic element according to the present invention can be produced very easily by dipping the two electrodes into the molten electrolyte, followed by subsequent cooling to ambient temperature.

The lithium ion conductor according to the present invention and the galvanic element containing it are characterised by especially favourable properties. Thus, according to the present invention, it is possible to produce a lithium ion conductor in a simple way which has a high conductivity, is very stable and does not undergo any decomposition with lithium. A galvanic element provided with the lithium ion conductor according to the present invention, which contains a lithium anode and a countercathode, is very small, has a low weight and a very high capacity. Furthermore, it can be recharged and, by melting the electrolytes, can again be brought into its original state.

The following Examples are given for the purpose of illustrating the present invention:

EXAMPLE 1

Lithium iodide was heated to 130° C. in order to drive off water. A fourfold amount of methanol, which has been predried with a conventional drying agent, referred to the mole amount of lithium iodide, was added thereto. The reaction took place in a dry room without special protection measures. The resultant LiI×4 methanol had a melting point of 50° C. The conductivity for LiX×4 CH$_3$OH was determined at 25° C. to be $>10^{-3}$ Ohm$^{-1}$ cm$^{-1}$.

EXAMPLE 2

A galvanic element was produced with lithium as anode, manganese dioxide as cathode and LiI×4 CH$_3$OH as ion conductor. The voltage of lithium against manganese dioxide was 2.8 volt. This voltage was stable, without an electrochemical decomposition of the electrolytes taking place. No chemical change or change of the electrical behaviour was observed over the course of weeks.

EXAMPLE 3

The activating enthalpy $E_a$ was determined for various coordinated complexes LiI×yMeOH, wherein y signifies 4 or 6. The results obtained are set out in the following Table:

TABLE

| Mole ratio CH$_3$OH/LiI | temperature range (°C.) | $E_a$ [eV] | state |
|---|---|---|---|
| 4 | −23 to +19 | 0.68 | solid |
| 4 | +26 to +60 | 0.16 | liquid |
| 6 | −24 to +13 | 0.20 | liquid |

EXAMPLE 4

Lithium bromide was reacted with a simple stoichiometric amount of ethanol as in Example 1. The resultant addition compound, LiBr×C$_2$H$_5$OH, had a conductivity of $>3.3\times10^{-3}$ Ohm$^{-1}$ cm$^{-1}$.

We claim:

1. A solid lithium ion conductor, consisting of an addition compound of a lithium halide with an alcohol, an amine or a basic organic heterocyclic nitrogen compound.

2. The lithium ion conductor of claim 1, wherein lithium iodide is used as the lithium halide.

3. The lithium ion conductor of claim 1, wherein the alcohol is a primary, secondary or tertiary mono- or polyhydroxy alcohol.

4. The lithium ion conductor of claim 3, wherein the alcohol is methanol, ethanol or propanol.

5. The lithium ion conductor of claim 1, wherein the amine is NR$_3$ wherein each R, independently of one another is an alkyl radical containing up to 6 carbon atoms or is an unsubstituted or substituted phenyl radical, and wherein zero, one or two of the substituents R represent hydrogen atoms.

6. The lithium ion conductor of claim 1, wherein the basic organic heterocyclic nitrogen compound is a heteroparaffin, a heteroaromatic or a heteroolefin.

7. The lithium ion conductor of claim 6, wherein the heteroaromatic contains 5 or 6 ring members.

8. The lithium ion conductor of claim 7, wherein the heteroaromatic is pyridine.

9. The lithium ion conductor of claim 1 which is LiX×4 methanol.

10. Process for the production of a lithium ion conductor according to claim 1, wherein the lithium halide and the alcohol, the amine or the basic organic heterocyclic nitrogen compound are mixed together and reacted.

11. A galvanic element consisting of lithium or a lithium-donating compound as anode, a known countercathode and a lithium ion conductor consisting of an addition compound of a lithium halide with an alcohol, an amine or a basic organic heterocyclic nitrogen compound.

12. The galvanic element of claim 11, wherein the countercathode is made of manganese dioxide, lead iodide or titanium disulphide.

13. The galvanic element of claim 11 wherein the addition compound is with an aliphatic alcohol with 1 to 6 carbon atoms and one or more hydroxy groups.

14. The galvanic element of claim 13 wherein the alcohol is methanol, ethanol or propanol.

15. The galvanic element of claim 11 wherein the addition compound is with aniline or a primary, secondary or tertiary alkylamine with up to 6 carbon atoms in the alkyl group.

16. The galvanic element of claim 11 wherein the addition compound is with pyridine.

17. The galvanic element of claim 11 wherein the addition compound is lithium iodide or bromide with 3, 4 or 6 methanol, ethanol or propanol molecules.

* * * * *

UNITED STATES PATENT AND TRADEMARK OFFICE
CERTIFICATE OF CORRECTION

PATENT NO. : 4,704,341

DATED : November 3, 1987

INVENTOR(S) : WErner Weppner et al.

It is certified that error appears in the above-identified patent and that said Letters Patent is hereby corrected as shown below:

Column 3, line 18, "LiX x 4 $CH_3OH$" should read --LiI x 4 $CH_3OH$--

Column 4, line 24, "LiX x 4" should read --LiI x 4"

Signed and Sealed this

Twelfth Day of July, 1988

Attest:

DONALD J. QUIGG

Attesting Officer

Commissioner of Patents and Trademarks